(12) United States Patent
Milbrandt

(10) Patent No.: US 6,947,441 B1
(45) Date of Patent: Sep. 20, 2005

(54) METHOD AND SYSTEM FOR VERIFYING SPECTRAL COMPATIBILITY OF DIGITAL SUBSCRIBER LINE CONNECTIONS

(75) Inventor: Celite Milbrandt, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 803 days.

(21) Appl. No.: 09/626,549

(22) Filed: Jul. 27, 2000

(51) Int. Cl.[7] ............................................. H04Q 11/02
(52) U.S. Cl. ..................................... 370/430; 370/463
(58) Field of Search ................................ 370/352, 210, 370/484, 494, 493, 490, 430, 419, 420, 421, 370/463; 375/222, 260, 365, 220, 221

(56) References Cited

U.S. PATENT DOCUMENTS

| | | | |
|---|---|---|---|
| 4,893,305 A * | 1/1990 | Fernandez et al. ........... | 370/254 |
| 5,440,564 A * | 8/1995 | Ovadia et al. ............... | 370/358 |
| 5,999,540 A * | 12/1999 | McGhee ...................... | 370/465 |
| 6,246,754 B1 * | 6/2001 | Cole et al. ................ | 379/93.29 |
| 6,272,169 B1 * | 8/2001 | Boswell et al. ............. | 375/222 |
| 6,292,559 B1 * | 9/2001 | Gaikwad et al. ............ | 379/417 |
| 6,304,578 B1 * | 10/2001 | Fluss .......................... | 370/413 |
| 6,343,077 B1 * | 1/2002 | Chin et al. ............... | 370/395.6 |
| 6,374,288 B1 * | 4/2002 | Bhagavath et al. ......... | 709/203 |
| 6,389,065 B1 * | 5/2002 | McGhee ...................... | 375/222 |
| 6,445,733 B1 * | 9/2002 | Zuranski et al. ............ | 375/231 |
| 6,631,120 B1 * | 10/2003 | Milbrandt ................... | 370/252 |

FOREIGN PATENT DOCUMENTS

| | | | |
|---|---|---|---|
| EP | 944281 A2 * | 9/1999 | .......... H04Q 11/04 |
| WO | WO 9948304 A2 * | 9/1999 | |

OTHER PUBLICATIONS

Sistanizadeh, K. "Spectral Compatibility of Asymmetrical Digital Subscriber Lines (ADSL) with Basic Rate DSLs, HDSLs, and T Lines". GLOBECOM '91. Phoenix, AZ. Dec. 2-5, 1991. vol. 3. pp. 1969-1973.*
Barton, M. et al. "Spectral Optimization of Discrete Multitone System on Twisted Wire Copper Pairs". IEEE ICC '95. Seattle, WA. Jun. 18-22, 1995. vol. 3. pp. 1668-1672.*
American National Standard For Telecommunications, Spectrum Management For Loop Transmission Systems, Aug. 14, 2000.

* cited by examiner

Primary Examiner—John Pezzlo
Assistant Examiner—Donald L Mills
(74) Attorney, Agent, or Firm—Baker Botts L.L.P.

(57) ABSTRACT

A system for verifying spectral compatibility of a communication system that utilizes at least one digital subscriber line protocol includes a plurality of digital subscriber line access multiplexers and a communications channel coupling the plurality of digital subscriber line access multiplexers. Each digital subscriber line access multiplexer is operable to transmit and receive at least one message over the communications channel. The message comprises information related to a training of a digital subscriber line modem by a carrier.

59 Claims, 3 Drawing Sheets

METHOD AND SYSTEM FOR VERIFYING SPECTRAL COMPATIBILITY OF DIGITAL SUBSCRIBER LINE CONNECTIONS

TECHNICAL FIELD OF THE INVENTION

This invention relates generally to data communication and, more particularly, to a system and method for verifying spectral compatibility of digital subscriber line connections.

BACKGROUND OF THE INVENTION

Digital Subscriber Line (DSL) technology allows subscribers to transmit both data and voice signals over the same twisted-pair copper telephone line. Data is transmitted over the line by signals using a communication frequency spectrum. Various DSL protocols, referred to in combination as XDSL, may manage the communication spectrum differently. The Synchronous Digital Subscriber Line (SDSL) protocol allows equal portions of the spectrum to be used to transmit data to and receive data from a subscriber. The Asynchronous Digital Subscriber Line (ADSL) protocol allows a larger part of the spectrum to be used to transmit data to a subscriber.

DSL connections use typical copper lines in telephone networks, and multiple copper wires are bundled together into cables called "binder groups." Electrical energy transmitted across one twisted-pair line may radiate energy onto adjacent twisted-pair lines, causing "crosstalk" or spectral interference on the adjacent lines. Different DSL protocols may be susceptible to different forms of crosstalk. For example, the ADSL protocol may be limited by far-end crosstalk, while the SDSL protocol may be more limited by near-end crosstalk.

Many DSL subscribers may be connected to a single central office using one or more digital subscriber line access multiplexers (DSLAM). Each DSLAM couples many DSL connections to a high-speed backbone network, such as an Asynchronous Transfer Mode (ATM) network. This allows multiple DSL users to access the backbone network at the same time.

The use of a DSLAM to connect multiple subscribers to the same backbone network may cause problems if different subscribers want to receive DSL service using different protocols. It is often difficult to configure a communication system to optimally support one DSL protocol without detrimentally impairing service using another DSL protocol. One approach involves the use of signal power limitations, which limit the amplitude, frequency distribution, and total power of electrical signals transmitted by a DSL carrier. Each DSL protocol has a corresponding signal power limitation. A DSL connection using a particular protocol cannot exceed that protocol's signal power limitation.

A problem with this approach is that power limitations may prevent some potential customers from receiving DSL service. Some potential customers may not be located near a central office. In order for a potential customer to receive DSL service using a particular protocol, a DSL carrier may need to use a signal power that exceeds the power limitations for that protocol. The potential customer may not be able to receive the type of DSL service that the customer wants.

Another problem with this approach is that the signal power limitations may prevent carriers from optimally using each DSL protocol. A carrier may be prevented from using a DSL protocol at an optimal level by the signal power limitations, even though the carrier would not be interfering with other DSL services at that time.

Further, it is difficult to ensure that all carriers are complying with the signal power guidelines. One carrier providing service through a central office cannot ensure that other carriers using the same central office are complying with the signal power limitations. A carrier that fails to comply with the limitations may detrimentally interfere with other carriers with little or no risk of detection.

SUMMARY OF THE INVENTION

The present invention recognizes a need for an improved method and system for verifying spectral compatibility of digital subscriber line connections that reduce or eliminate at least some of the shortcomings of prior systems and methods.

In accordance with one embodiment of the present invention, a system for verifying spectral compatibility of a communication system that utilizes at least one digital subscriber line protocol includes a plurality of digital subscriber line access multiplexers. The system also includes a communications channel coupling the plurality of digital subscriber line access multiplexers. Each digital subscriber line access multiplexer is operable to transmit and receive at least one message over the communications channel. The message comprises information related to a training of a digital subscriber line modem by a carrier.

In accordance with another embodiment of the present invention, a method for verifying spectral compatibility of a communication system that utilizes at least one digital subscriber line protocol includes coupling a digital subscriber line access multiplexer to a spectral management channel and receiving a spectral management message over the spectral management channel. The spectral management message comprises information related to a training of a digital subscriber line modem by a carrier.

Technical advantages of some embodiments of the present invention include the ability to ensure that carriers operating in the same environment are not excessively interfering with a digital subscriber line (DSL) connection. One carrier cannot excessively affect other carriers' services and escape detection. A carrier being adversely affected by another carrier's service may identify and signal the interfering carrier.

Another technical advantage of some embodiments of the present invention is the ability to provide optimal service to each DSL subscriber without excessively interfering with other subscribers' connections. By coupling a digital subscriber line access multiplexer (DSLAM) to a management channel, a carrier may learn when a DSL connection excessively affects other connections. The carrier may then attempt to reestablish that DSL connection using different communication parameters. Once the carrier finds acceptable parameters that do not excessively interfere with other DSL connections, the carrier may use those parameters to provide DSL service.

A further advantage is the ability to provide DSL service to additional customers. A carrier may not be limited to specific power thresholds for each DSL protocol, so the carrier may be able to provide DSL service to subscribers located a greater distance from a central office. As long as the signal power settings used to provide service to the customer do not excessively interfere with other carriers' services, the customer may receive the service.

Other technical advantages are readily apparent to one of skill in the art from the attached Figures, description, and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF EXAMPLE EMBODIMENTS OF THE INVENTION

Example embodiments of the invention are best understood by referring to FIGS. 1 through 6 of the drawings, like numerals being used for like and corresponding parts of the various drawings.

Figure 1:
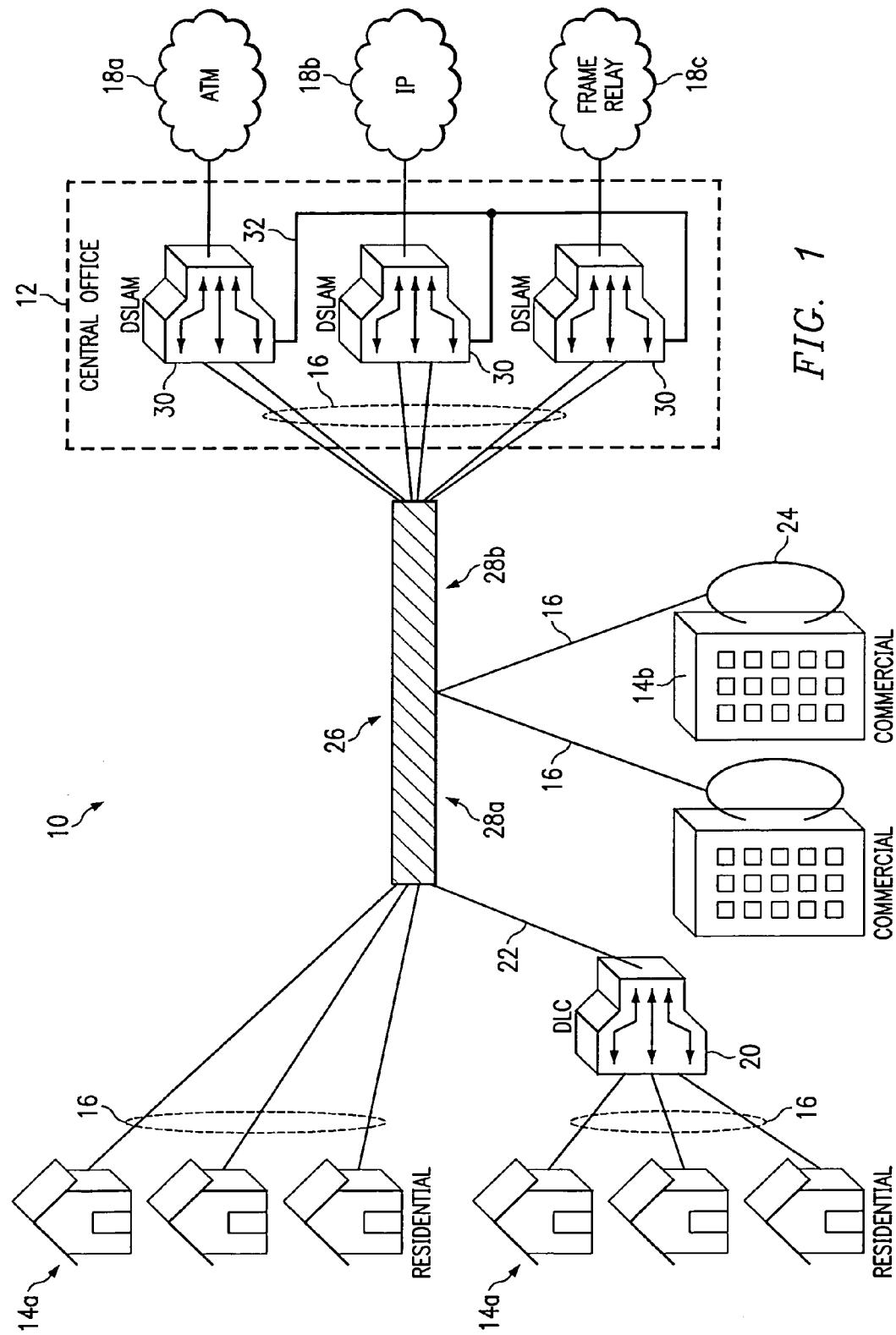
FIG. 1 is a diagram illustrating an example communication system for verifying spectral compatibility of digital subscriber line connections constructed according to the teachings of the present invention.

FIG. 1 is a diagram illustrating an example communication system 10 for verifying spectral compatibility of digital subscriber line connections constructed according to the teachings of the present invention. In the illustrated embodiment, communication system 10 comprises a central office 12, a plurality of residential subscribers 14a, and a plurality of commercial subscribers 14b.

In general, central office 12 comprises a plurality of digital subscriber line access multiplexers (DSLAM) 30. DSLAMs 30 are coupled by a spectral management channel 32, which comprises a communications channel. DSLAMs 30 communicate over spectral management channel 32 to exchange messages related to the training of a digital subscriber line (DSL) modem. In one embodiment, each DSLAM 30 may transmit and/or receive two messages over spectral management channel 32. One message informs DSLAMs 30 when a DSL carrier has at least received a request to train a DSL modem. The other message informs DSLAMs 30 when a trained DSL modem violates a predetermined compliance guideline.

Communication system 10 employs XDSL technology to provide high-bandwidth data service to a number of residential subscribers 14a and/or commercial subscribers 14b (referred to collectively as "subscribers 14"). At least one DSL carrier may provide DSL service to subscribers 14 through central office 12 using one or more DSL protocols. Central office 12 may be coupled to subscribers 14 using twisted-pair subscriber lines 16 and one or more high-speed backbone networks, including an Asynchronous Transfer Mode (ATM) network 18a, an Internet Protocol (IP) network 18b, and a frame relay network 18c. Throughout this document, the term "couple" refers to any direct or indirect connection between two or more elements. The elements said to be "coupled" to one another may or may not physically contact one another.

Each residential subscriber 14a may include a telephone and a computer coupled to a subscriber line 16. The computer may comprise any suitable computing device. The computer may also be equipped with a XDSL modem to receive DSL service from a DSL carrier over subscriber line 16. In one embodiment, residential subscriber 14a may also include a splitter (not explicitly shown) operable to split a subscriber line 16 into a twisted-pair phone line and a twisted-pair data line. The telephone communicates over the twisted-pair phone line, and the computer communicates over the twisted-pair data line. In another embodiment, a splitter is not used to provide DSL service over subscriber lines 16.

Residential subscriber 14a may be coupled directly to central office 12 through subscriber line 16. A plurality of residential subscribers 14a may also be coupled to a digital loop carrier (DLC) 20. DLC 20 is operable to concentrate communication signals to and from residential subscribers 14a over a high-bandwidth line 22. DLC 20 is also operable to perform multiplexing and demultiplexing operations to allow multiple residential subscribers 14a to communicate over high-bandwidth line 22. DLC 20 may comprise any suitable digital loop carrier such as, for example, a Cisco 6732 Multiservice Access Platform or a Cisco 6015 IP DSL Switch manufactured by CISCO SYSTEMS, INC.

Each commercial subscriber 14b may include multiple telephones and multiple computers coupled to a local network 24. Commercial subscribers 14b may receive DSL service through one or more subscriber lines 16 coupling local network 24 to central office 12. Commercial subscriber 14b may include any number of telephones and/or computers coupled to subscriber lines 16.

Subscriber lines 16 couple subscribers 14 to central office 12. Subscriber line 16 may comprise twisted-pair wiring that is commonly installed at subscriber premises and as a local loop in many public switched telephone networks. Subscriber line 16 may comprise an unshielded twisted pair, shielded twisted pair, or any other suitable type or category of twisted-pair wiring made of copper or other suitable material.

Subscriber lines 16 may be grouped together between subscribers 14 and central office 12 into one or more binder groups 26. Each binder group 26 may comprise one or more binder group segments 28a and 28b. In general, a binder group segment 28 comprises a collection of subscriber lines 16 that share a common sheath. In the illustrated embodiment, binder group segment 28a includes subscriber lines 16 from both residential subscribers 14a and commercial subscribers 14b. Binder group segment 28b includes subscriber lines 16 for residential subscribers 14a.

Figure 2:
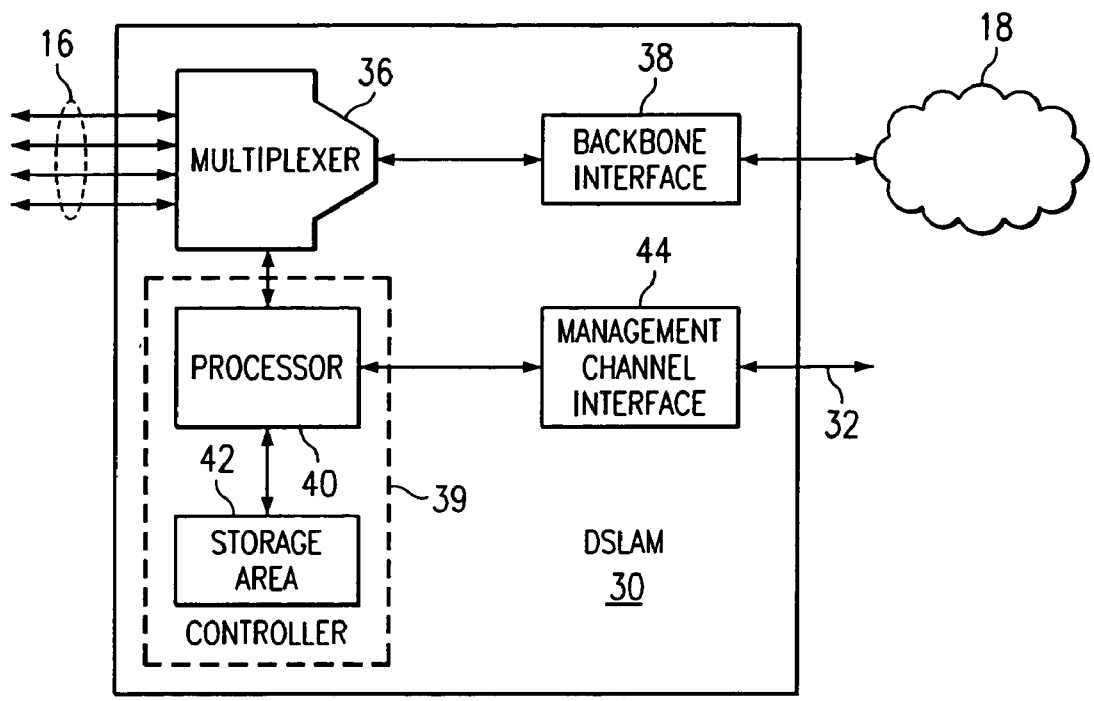
FIG. 2 is a block diagram illustrating additional details of the example digital subscriber line access multiplexer of FIG. 1 according to the teachings of the present invention.

Central office 12 is operable to facilitate communication between subscribers 14 and backbone networks 18. In the illustrated embodiment, central office 12 comprises a plurality of DSLAMs 30. Each DSLAM 30 is operable to facilitate communication between a plurality of subscribers 14 and one of backbone networks 18. DSLAM 30 is also operable to "train" a XDSL modem used by a subscriber 14, which adjusts the modem to current conditions of subscriber line 16. Each DSLAM 30 is further operable to perform multiplexing and demultiplexing operations to allow multiple subscribers 14 to communicate with backbone network 18. Exemplary DSLAMs 30 include a Cisco 6732 Multiservice Access Platform or a Cisco 6160 Digital Subscriber Line Access Concentrator manufactured by CISCO SYS- TEMS, INC. One embodiment of DSLAM 30 is shown in FIG. 2, which is described below.

In one aspect of operation, DSL carriers provide XDSL service to subscribers 14 through DSLAMs 30. Data is transferred between central office 12 and subscribers 14 over subscriber lines 16. Because subscriber lines 16 are bundled together in binder groups 26, and for other reasons, providing xDSL service over a first subscriber line 16 may cause spectral interference in a second subscriber line 16. This spectral interference creates noise in the second subscriber line 16, which may degrade DSL service provided over the second subscriber line 16. The data transfer rate of the DSL service over the second subscriber line 16 drops, allowing less data to be transferred in a given time period.

To reduce the likelihood that one carrier providing DSL service will detrimentally impair the DSL service provided by another carrier, each DSLAM 30 is coupled to spectral management channel 32. DSLAMs 30 are operable to communicate over spectral management channel 32 and exchange one or more spectral management messages over spectral management channel 32. The exchange of messages over spectral management channel 32 allows each DSLAM 30 to monitor and manage the communication spectrum used to provide DSL service to subscribers 14. Spectral management channel 32 may comprise any suitable communication link between DSLAMs 30. In one embodiment, spectral management channel 32 comprises a 10/100 base-T Ethernet connection.

Although FIG. 1 illustrates one embodiment of communication system 10, those skilled in the art will recognize that numerous changes may be made to system 10 without departing from the scope of the present invention. For example, central office 12 is illustrated in FIG. 1 as comprising three DSLAMs 30, but any number of DSLAMs 30 may be used in each central office 12. Also, communication system 10 is illustrated as comprising a single central office 12, but any number of central offices 12 may be used in system 10.

Additional details of DSLAM 30 are described in greater detail in connection with FIG. 2. Example messages communicated by DSLAM 30 are described in greater detail in connection with FIGS. 3 and 4. Example methods used in training a XDSL modem are described in greater detail with respect to FIGS. 5 and 6.

FIG. 2 is a block diagram illustrating additional details of the example DSLAM 30 of FIG. 1 according to the teachings of the present invention. In the illustrated embodiment, DSLAM 30 comprises a multiplexer 36, a backbone interface 38, a controller 39, and a management channel interface 44.

Multiplexer 36 is coupled to a plurality of subscriber lines 16, backbone interface 38, and controller 39. Multiplexer 36 is operable to perform multiplexing and demultiplexing operations to facilitate communication between multiple subscribers 14 and a backbone network 18. Multiplexer 36 allows multiple subscribers 14 to communicate with backbone network 18 by receiving signals from subscribers 14 and aggregating the signals for transmission to backbone network 18 over a high-bandwidth link. Multiplexer 36 may comprise any hardware, software, firmware, or combination thereof operable to multiplex and demultiplex communication signals between subscribers 14 and backbone network 18.

Backbone interface 38 is coupled to multiplexer 36 and backbone network 18. Backbone interface 38 allows DSLAM 30 to communicate with one of backbone networks 18. Backbone interface 38 may comprise any suitable hardware, software, firmware, or combination thereof operable to facilitate communication between DSLAM 30 and backbone network 18. Backbone interface 38 may, for example, comprise an ATM interface card, an IP interface, or a frame relay interface card.

Controller 39 is coupled to multiplexer 36 and management channel interface 44. Controller 39 is operable to monitor the quality of DSL service provided to a subscriber 14 through DSLAM 30. Controller 39 may, for example, monitor the data transfer rate achieved by DSLAM 30 and subscriber 14 over a DSL connection. Controller 39 is further operable to communicate over spectral management channel 32 through management channel interface 44. Controller 39 may comprise any suitable hardware, software, firmware, or combination thereof operable to monitor the quality of xDSL service and communicate over spectral management channel 32. In the illustrated embodiment, controller 39 comprises a processor 40 and a storage area 42 operable to store one or more software programs for execution on processor 40. Controller 39 could also comprise, for example, an application-specific integrated circuit (ASIC) or a field programmable gate array (FPGA).

Management channel interface 44 is coupled to controller 39 and spectral management channel 32. Management channel interface 44 is operable to facilitate communication between DSLAMs 30 over spectral management channel 32. Management channel interface 44 may comprise any suitable interface operable to facilitate communication over spectral management channel 32. In one embodiment, management channel interface 44 comprises a 10/100 base-T Ethernet port.

In one aspect of operation, controller 39 monitors the quality of current XDSL service provided by DSLAM 30 and manages the communication spectrum used by DSLAMs 30 to provide that XDSL service. In one embodiment, each DSLAM 30 is operable to transmit and/or receive at least one spectral management message over spectral management channel 32. Example spectral management messages are illustrated in FIG. 3, which illustrates a training message, and in FIG. 4, which illustrates a distress message.

Figure 3:
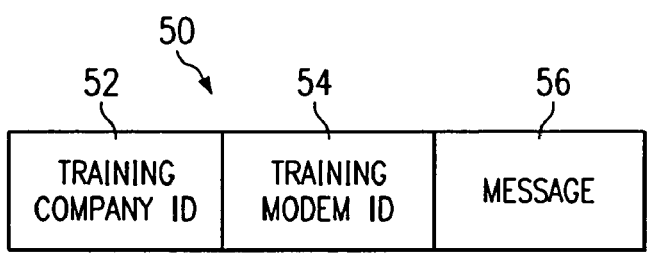
FIG. 3 is a block diagram illustrating an example training message transmitted over the spectral management channel of FIG. 1 according to the teachings of the present invention.

FIG. 3 is a block diagram illustrating an example training message 50 transmitted over spectral management channel 32 of FIG. 1 according to the teachings of the present invention. In the illustrated embodiment, training message 50 comprises a training company identifier 52, a training modem identifier 54, and a message field 56. Other embodiments of training message 50 may be used without departing from the scope of the present invention.

Training message 50 is operable to indicate that a DSL carrier using a first DSLAM 30 has at least received a request to train a xDSL modem over a subscriber line 16. The training of the XDSL modem, or other reasons, may cause spectral interference in subscriber lines 16 that are in the same binder group segment 28. Training company identifier 52 is operable to identify the DSL carrier that has at least received the request to train the XDSL modem, and training modem identifier 54 is operable to identify the XDSL modem. In one embodiment of communication system 10, each carrier is identified by an alphanumeric code, and each xDSL modem is also identified by an alphanumeric code. Any suitable code that uniquely identifies each carrier and each xDSL modem may be used. Message field 56 identifies message 50 as a training message.

After the DSL carrier receives the request to train the XDSL modem using a DSLAM 30, controller 39 in the DSLAM 30 retrieves the carrier and modem's identifying codes. The codes may, for example, be stored in storage area 42 or other memory. Controller 39 uses the identifying codes to compose training message 50. Controller 39 then transmits training message 50 to other DSLAMs 30 over spectral management channel 32. Controller 39 may be operable to transmit the training message after the DSL carrier receives the request to train the XDSL modem. Controller 39 may also be operable to transmit the training message any other time. In a particular embodiment, controller 39 transmits the training message ten milliseconds before DSLAM 30 trains the XDSL modem.

A DSLAM 30 that receives a training message 50 over spectral management channel 32 may retrieve the training company identifier 52 and the training modem identifier 54 from training message 50. Controller 39 may then store the retrieved training company identifier 52 and training modem identifier 54 for later use.

Figure 4:
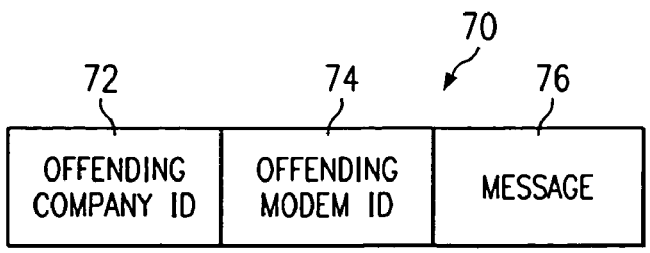
FIG. 4 is a block diagram illustrating an example distress message transmitted over the spectral management channel of FIG. 1 according to the teachings of the present invention.

FIG. 4 is a block diagram illustrating an example distress message 70 transmitted over spectral management channel 32 of FIG. 1 according to the teachings of the present invention. In the illustrated embodiment, distress message 70 comprises an offending company identifier 72, an offending modem identifier 74, and a message field 76. Other embodiments of distress message 70 may be used without departing from the scope of the present invention.

Distress message 70 is operable to indicate that a trained XDSL modem is causing excessive spectral interference with at least one other DSL connection. Offending company identifier 72 is operable to identify the DSL carrier that trained the XDSL modem that is excessively interfering with at least one other DSL connection, violating one or more compliance guidelines. Offending modem identifier 74 is operable to identify the offending modem violating the guidelines. Throughout this document, the phrase "offending modem" refers to a modem that is causing spectral interference in violation of at least one compliance guideline. Message field 76 identifies message 70 as a distress message.

When a trained xDSL modem is excessively interfering with at least one current DSL connection in violation of a compliance guideline, controller 39 in DSLAM 30 retrieves the training company identifier 52 and training modem identifier 54 corresponding to the offending modem. Controller 39 uses the retrieved training company identifier 52 and training modem identifier 54 to compose distress message 70. Controller 39 then transmits distress message 70 to other DSLAMs 30 over spectral management channel 32.

A DSLAM 30 that receives a distress message 70 over spectral management channel 32 may retrieve the offending company identifier 72 and the offending modem identifier 74 from distress message 70. Controller 39 may then determine whether the DSLAM 30 that received distress message 70 also trained the offending modem. If the receiving DSLAM 30 trained the offending modem, controller 39 may take corrective action. DSLAM 30 could, for example, terminate the connection formed between DSLAM 30 and the offending modem. DSLAM 30 could also retrain the offending modem using different settings that may not cause excessive spectral interference.

Controller 39 may use any suitable compliance guideline in determining whether a trained xDSL modem causes excessive interference in other subscriber lines 16. For example, the compliance guidelines could be defined by the decrease in the data transfer rate for a subscriber line 16 caused by the interference, compared to the achievable bit rate expected or previously achieved for that subscriber line 16.

In one embodiment, DSLAM 30 may track the number of subscriber lines 16 in a binder group 26 that are currently providing xDSL service. DSLAM 30 uses the number of current DSL connections, called n, to predict an acceptable level of interference. In this embodiment, DSLAMs 30 are operable to determine an expected, acceptable level of interference based on the current number of DSL connections and to issue a distress message when that level is exceeded.

A compliance guideline may apply to all types of DSL service or to a subset of DSL services. For example, some DSL services operate using a standard defined by the European Telecommunications Standards Institute (ETSI), American National Standards Institute (ANSI), or International Telecommunications Union (ITU). When monitoring a particular DSL connection based on one of these standards, DSLAM 30 may treat all n DSL connections the same. DSLAM 30 predicts the level of interference that would be expected from n DSL connections that use the same protocol and the same standard. In this embodiment, DSLAM 30 may issue a distress message when the interference level exceeds the amount of degradation normally caused by n other DSL connections. In another embodiment, DSLAM 30 may issue a distress message when the interference level exceeds the expected level by a predetermined amount, such as by five decibels.

For DSL connections that do not use an ETSI, ANSI, or ITU standard, DSLAM 30 may treat all other DSL connections as being in the same "class" of DSL service as the monitored connection. "Classes" of DSL service may be defined, for example, by the American National Standard for Telecommunications "Spectral Management for Loop Transmission Systems" T1E1.4/99-002R6 draft standard. In this embodiment, DSLAM 30 may issue a distress message when the interference level exceeds the amount of degradation normally caused by n other DSL connections of the same class. In another embodiment, DSLAM 30 may issue a distress message when the actual interference level exceeds the expected level by a predetermined amount, such as by five decibels.

Other compliance guidelines may be used by communication system 10 without departing from the scope of the present invention. For example, another compliance guideline could call for distress message 70 to be sent if service for a monitored DSL connection suffers a particular amount of degradation after a XDSL modem is trained. In a particular embodiment, distress message 70 is sent when the monitored DSL connection suffers a particular amount of degradation and the DSL technology used is not ADSL or Very-high-data-rate Digital Subscriber Line (VDSL) technology.

Figure 5:
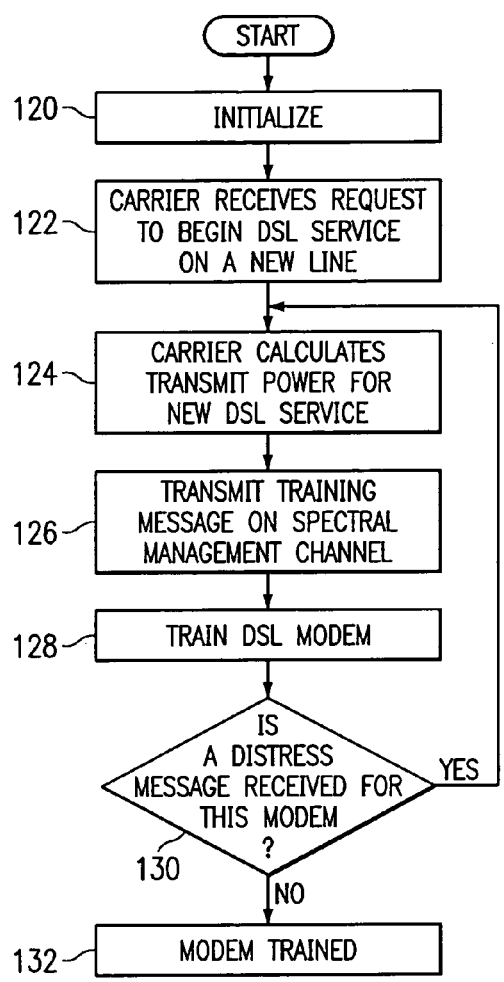
FIG. 5 is a flowchart illustrating an example method of determining whether training a digital subscriber line modem causes excessive spectral interference according to the teachings of the present invention.

FIG. 5 is a flowchart illustrating an example method of determining whether training a digital subscriber line modem causes excessive spectral interference according to the teachings of the present invention. DSLAM 30 is initialized at a step 120. A DSL carrier using at least one DSLAM 30 in system 10 receives a request to train a xDSL modem at a step 122. The request could, for example, include an identification of the modem being trained. The DSL carrier calculates the signal transmit power to use in establishing the XDSL connection with the subscriber at a step 124. DSLAM 30 composes and transmits a training message over spectral management channel 32 at a step 126. The training message could identify both the DSL carrier training the modem and the modem. In a particular embodiment, the training message may be transmitted ten milliseconds before DSLAM 30 trains the XDSL modem. DSLAM 30 trains the xDSL modem at a step 128 using, for example, the transmit power calculated at step 124.

DSLAM 30 waits to receive a distress message over spectral management channel 32 at a step 130. A distress message may be transmitted by other DSLAMs 30 if the training of the XDSL modem excessively interferes with existing DSL connections. If no distress message associated with the trained modem is received, the XDSL modem remains trained at a step 132. If a distress message associated with the trained modem is received, DSLAM 30 may retrain the modem at step 124.

Although FIG. 5 illustrates the transmission of a training message after the calculation of the transmit power, those skilled in the art will recognize that the training message may be transmitted to other DSLAMs 30 at other times. DSLAM 30 could, for example, transmit the training message before calculating the signal transmit power or after training the XDSL modem.

Figure 6:
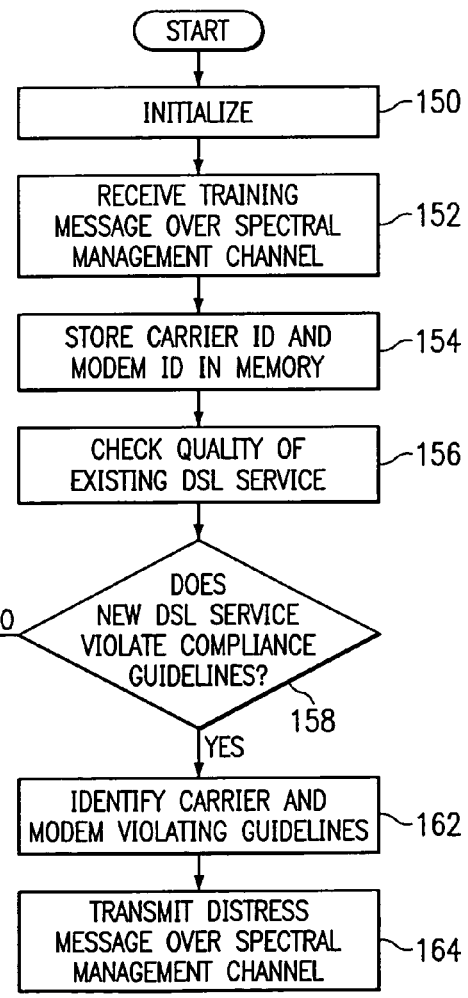
FIG. 6 is a flowchart illustrating an example method of signaling that a trained digital subscriber line modem excessively interferes with another digital subscriber line connection according to the teachings of the present invention.

FIG. 6 is a flowchart illustrating an example method of signaling that a trained digital subscriber line modem excessively interferes with another digital subscriber line connection according to the teachings of the present invention. DSLAM 30 is initialized at a step 150. DSLAM 30 receives a training message from another DSLAM 30 over spectral management channel 32 at a step 152. The training message may, for example, identify a DSL carrier and a modem being trained by the DSL carrier. DSLAM 30 stores the training carrier identifier 52 and training modem identifier 54 from the training message at a step 154.

DSLAM 30 checks the quality of current DSL connections supported by DSLAM 30 at a step 156. This could include, for example, comparing the current data transfer rate of an existing connection against the anticipated bit rate, taking into account other acceptable interference from existing DSL connections. DSLAM 30 determines if the training of the XDSL modem excessively interferes with the current DSL connections at a step 158. This could include, for example, comparing the amount of interference with at least one compliance guideline.

If the training of the XDSL modem does not violate the compliance guidelines, DSLAM 30 allows the trained xDSL modem to deliver DSL service to a subscriber 14 at a step 160. If the training of the XDSL modem does violate at least one of the guidelines, DSLAM 30 identifies the DSL carrier that trained the offending modem and the modem at a step 162. This may include, for example, retrieving the data associated with a previously-received training message. DSLAM 30 composes and transmits a distress message over spectral management channel 32 at a step 164.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for verifying spectral compatibility of a communication system that utilizes at least one digital subscriber line protocol, comprising:
   a plurality of digital subscriber line access multiplexers; and
   a communications channel coupling the plurality of digital subscriber line access multiplexers, each digital subscriber line access multiplexer operable to transmit and receive at least one training message over the communications channel, the training message indicating that a carrier has at least received a request to train a digital subscriber line modem and the training message comprising:
      a company identifier identifying the carrier that has at least received the request to train the digital subscriber line modem; and
      a modem identifier identifying the digital subscriber line modem.

2. The system of claim 1, wherein the communications channel comprises a 10/100 base-T Ethernet connection.

3. The system of claim 1, wherein each digital subscriber line access multiplexer comprises a 10/100 base-T Ethernet port.

4. The system of claim 1, wherein each digital subscriber line access multiplexer is operable to transmit a distress message over the communications channel, the distress message operable to indicate that the digital subscriber line modem violates at least one compliance guideline.

5. The system of claim 4, wherein the distress message comprises:
   a company identifier identifying the carrier that trained the digital subscriber line modem; and
   a modem identifier identifying the digital subscriber line modem.

6. A digital subscriber line access multiplexer comprising:
   a multiplexer operable to receive signals from a plurality of digital subscriber line connections and to aggregate the signals for transmission over a high-speed backbone line;
   a controller operable to receive a training message, the training message indicating that a carrier has at least received a request to train a digital subscriber line modem and the training message comprising:
      a company identifier identifying the carrier that has at least received the request to train the digital subscriber line modem; and
      a modem identifier identifying the digital subscriber line modem; and
   an interface coupled to the controller and operable to receive the spectral management message over a spectral management channel.

7. The digital subscriber line access multiplexer of claim 6, wherein:
   the controller is also operable to generate a second spectral management message; and
   the interface is also operable to transmit the second spectral management message over the spectral management channel.

8. The digital subscriber line access multiplexer of claim 6, wherein the controller is operable to receive a distress message, the distress message operable to indicate that the digital subscriber line modem violates at least one compliance guideline.

9. The digital subscriber line access multiplexer of claim 8, wherein the distress message comprises:
   a company identifier identifying a carrier that trained the digital subscriber line modem; and
   a modem identifier identifying the digital subscriber line modem.

10. The digital subscriber line access multiplexer of claim 6, wherein the controller is further operable to generate a distress message using a previously-received training message.

11. The digital subscriber line access multiplexer of claim 6, wherein the interface comprises a 10/100 base-T Ethernet port.

12. A method for verifying spectral compatibility of a communication system that utilizes at least one digital subscriber line protocol, comprising:
  coupling a digital subscriber line access multiplexer to a spectral management channel; and
  transmitting a training message over the spectral management channel, the training message indicating that a carrier has at least received a request to train a digital subscriber line modem and the training message comprising:
    a company identifier identifying the carrier that has at least received the request to train the digital subscriber line modem; and
    a modem identifier identifying the digital subscriber line modem.

13. The method of claim 12, further comprising training the digital subscriber line modem.

14. The method of claim 12, further comprising transmitting a distress message over the spectral management channel, the distress message operable to indicate that the digital subscriber line modem violates at least one compliance guideline.

15. The method of claim 14, wherein the distress message comprises:
  a company identifier identifying the carrier that trained the digital subscriber line modem; and
  a modem identifier identifying the digital subscriber line modem.

16. The method of claim 14, further comprising identifying the carrier that trained the digital subscriber line modem using a previously-received training message.

17. A method for verifying spectral compatibility of a communication system that utilizes at least one digital subscriber line protocol, comprising:
  coupling a digital subscriber line access multiplexer to a spectral management channel; and
  receiving a training message over the spectral management channel, the training message indicating that a carrier has at least received a request to train a digital subscriber line modem and the training message comprising:
    a company identifier identifying the carrier that has at least received the request to train the digital subscriber line modem; and
    a modem identifier identifying the digital subscriber line modem.

18. The method of claim 17, further comprising receiving a distress message over the spectral management channel, the distress message operable to indicate that the digital subscriber line modem violates at least one compliance guideline.

19. The method of claim 18, wherein the distress message comprises:
  a company identifier identifying the carrier that trained the digital subscriber line modem; and
  a modem identifier identifying the digital subscriber line modem.

20. The method of claim 18, further comprising retraining the digital subscriber line modem in response to receiving the distress message.

21. A system for verifying spectral compatibility of a communication system that utilizes at least one digital subscriber line protocol, comprising:
  a computer readable medium; and
  software encoded on the computer readable medium, the software operable when executed to transmit and receive a training message over a spectral management channel, the training message indicating that a carrier has at least received a request to train a digital subscriber line modem and the training message comprising:
    a company identifier identifying the carrier that has at least received the request to train the digital subscriber line modem; and
    a modem identifier identifying the digital subscriber line modem.

22. The system of claim 21, wherein the software is further operable when executed to transmit and receive a distress message, the distress message operable to indicate that the digital subscriber line modem violates at least one compliance guideline.

23. The system of claim 22, wherein the distress message comprises:
  a company identifier identifying the carrier that trained the digital subscriber line modem; and
  a modem identifier identifying the digital subscriber line modem.

24. The system of claim 22, wherein the software is operable to identify the carrier that trained the digital subscriber line modem using a previously-received training message.

25. A system for verifying spectral compatibility of a communication system that utilizes at least one digital subscriber line protocol, comprising:
  means for receiving signals from a plurality of digital subscriber line connections and aggregating the signals for transmission over a high-speed backbone line;
  means for generating and receiving at least one training message, the training message indicating that a carrier has at least received a request to train a digital subscriber line modem and the training message comprising:
    a company identifier identifying the carrier that has at least received the request to train the digital subscriber line modem; and
    a modem identifier identifying the digital subscriber line modem; and
  means for coupling the processing means to a spectral management channel.

26. The system of claim 25, wherein the message comprises a distress message, the distress message operable to indicate that the digital subscriber line modem violates at least one compliance guideline.

27. The system of claim 26, wherein the distress message comprises:
  a company identifier identifying the carrier that trained the digital subscriber line modem; and
  a modem identifier identifying the digital subscriber line modem.

28. A system for verifying spectral compatibility of a communication system that utilizes at least one digital subscriber line protocol, comprising:
  a plurality of digital subscriber line access multiplexers; and
  a communications channel coupling the plurality of digital subscriber line access multiplexers, each digital subscriber line access multiplexer operable to transmit a distress message over the communications channel, the distress message indicating that a digital subscriber line modem violates at least one compliance guideline and the distress message comprising:
    a company identifier identifying a carrier that trained the digital subscriber line modem; and a modem identifier identifying the digital subscriber line modem.

29. The system of claim 28, wherein the communications channel comprises a 10/100 base-T Ethernet connection.

30. The system of claim 28, wherein each digital subscriber line access multiplexer comprises a 10/100 base-T Ethernet port.

31. The system of claim 28, wherein each digital subscriber line access multiplexer is further operable to transmit a training message over the communications channel, the training message indicating that the carrier has at least received a request to train the digital subscriber line modem.

32. A digital subscriber line access multiplexer comprising:
a multiplexer operable to receive signals from a plurality of digital subscriber line connections and to aggregate the signals for transmission over a high-speed backbone line;
a controller operable to receive a distress message, the distress message indicating that a digital subscriber line modem violates at least one compliance guideline and the distress message comprising:
a company identifier identifying a carrier that trained the digital subscriber line modem; and
a modem identifier identifying the digital subscriber line modem; and
an interface coupled to the controller and operable to receive the distress message over a spectral management channel.

33. The digital subscriber line access multiplexer of claim 32, wherein:
the controller is also operable to generate a second distress message; and
the interface is also operable to transmit the second distress message over the spectral management channel.

34. The digital subscriber line access multiplexer of claim 32, wherein the controller is operable to receive a training message, the training message indicating that a carrier has at least received a request to train the digital subscriber line modem.

35. The digital subscriber line access multiplexer of claim 32, wherein the controller is further operable to generate the distress message using a previously-received training message.

36. The digital subscriber line access multiplexer of claim 32, wherein the interface comprises a 10/100 base-T Ethernet port.

37. A digital subscriber line access multiplexer comprising:
a multiplexer operable to receive signals from a plurality of digital subscriber line connections and to aggregate the signals for transmission over a high-speed backbone line;
a controller operable to receive a spectral management message, the spectral management message comprising information related to a training of a digital subscriber line modem over one of the subscriber lines, and to generate a distress message using a previously-received training message; and
an interface coupled to the controller and operable to receive the spectral management message over a spectral management channel.

38. The digital subscriber line access multiplexer of claim 37, wherein:
the controller is also operable to generate a second spectral management message; and
the interface is also operable to transmit the second spectral management message over the spectral management channel.

39. The digital subscriber line access multiplexer of claim 37, wherein the controller is further operable to receive a training message, the training message indicating that a carrier has at least received a request to train the digital subscriber line modem.

40. The digital subscriber line access multiplexer of claim 37, wherein the controller is operable to receive a distress message, the distress message indicating that the digital subscriber line modem violates at least one compliance guideline.

41. The digital subscriber line access multiplexer of claim 37, wherein the interface comprises a 10/100 base-T Ethernet port.

42. A method for verifying spectral compatibility of a communication system that utilizes at least one digital subscriber line protocol, comprising:
coupling a digital subscriber line access multiplexer to a spectral management channel; and
transmitting a distress message over the spectral management channel, the distress message indicating that a digital subscriber line modem violates at least one compliance guideline and the distress message comprising:
a company identifier identifying a carrier that trained the digital subscriber line modem; and
a modem identifier identifying the digital subscriber line modem.

43. The method of claim 42, further comprising transmitting a training message, the training message indicating that the carrier has at least received a request to train the digital subscriber line modem.

44. The method of claim 43, further comprising training the digital subscriber line modem.

45. The method of claim 42, further comprising identifying the carrier that trained the digital subscriber line modem using a previously-received training message.

46. A method for verifying spectral compatibility of a communication system that utilizes at least one digital subscriber line protocol, comprising:
coupling a digital subscriber line access multiplexer to a spectral management channel;
identifying a carrier that trained a digital subscriber line modem using a previously-received training message; and
transmitting a distress message over the spectral management channel, the distress message indicating that the digital subscriber line modem violates at least one compliance guideline.

47. The method of claim 46, further comprising transmitting a training message, the training message indicating that the carrier has at least received a request to train the digital subscriber line modem.

48. The method of claim 46, further comprising training the digital subscriber line modem.

49. A method for verifying spectral compatibility of a communication system that utilizes at least one digital subscriber line protocol, comprising:
coupling a digital subscriber line access multiplexer to a spectral management channel; and
receiving a distress message over the spectral management channel, the distress message indicating that a digital subscriber line modem violates at least one compliance guideline and the distress message comprising:

a company identifier identifying a carrier that trained the digital subscriber line modem; and a modem identifier identifying the digital subscriber line modem.

50. The method of claim 49, further comprising receiving a training message, the training message indicating that the carrier has at least received a request to train the digital subscriber line modem.

51. The method of claim 49, further comprising retraining the digital subscriber line modem in response to receiving the distress message.

52. A system for verifying spectral compatibility of a communication system that utilizes at least one digital subscriber line protocol, comprising:

a computer readable medium; and software encoded on the computer readable medium, the software operable when executed to transmit and receive a distress message over a spectral management channel, the distress message indicating that a digital subscriber line modem violates at least one compliance guideline and the distress message comprising:

a company identifier identifying a carrier that trained the digital subscriber line modem; and a modem identifier identifying the digital subscriber line modem.

53. The system of claim 52, wherein the software is further operable to transmit a training message, the training message indicating that the carrier has at least received a request to train the digital subscriber line modem.

54. The system of claim 53, wherein the software is further operable to identify the carrier that trained the digital subscriber line modem using a previously-received training message.

55. A system for verifying spectral compatibility of a communication system that utilizes at least one digital subscriber line protocol, comprising:

a computer readable medium; and software encoded on the computer readable medium, the software operable when executed to transmit and receive a distress message over a spectral management channel, the distress message indicating that a digital subscriber line modem violates at least one compliance guideline, and to identify a carrier that trained the digital subscriber line modem using a previously-received training message.

56. The system of claim 55, wherein the software is further operable to transmit a training message, the training message indicating that the carrier has at least received a request to train the digital subscriber line modem.

57. The system of claim 55, wherein the distress message comprises:

a company identifier identifying a carrier that trained the digital subscriber line modem; and a modem identifier identifying the digital subscriber line modem.

58. A system for verifying spectral compatibility of a communication system that utilizes at least one digital subscriber line protocol, comprising:

means for receiving signals from a plurality of digital subscriber line connections and aggregating the signals for transmission over a high-speed backbone line;

means for generating and receiving a training message, the training message indicating that a carrier has at least received a request to train a digital subscriber line modem and the training message comprising:

a company identifier identifying the carrier that has at least received the request to train the digital subscriber line modem; and a modem identifier identifying the digital subscriber line modem; and means for coupling the processing means to a spectral management channel.

59. The system of claim 58, further comprising means for transmitting a distress message, the distress message indicating that the digital subscriber line modem violates at least one compliance guideline.

* * * * *